(12) United States Patent
Vance et al.

(10) Patent No.: US 9,606,001 B2
(45) Date of Patent: Mar. 28, 2017

(54) SYSTEMS AND METHODS FOR MONITORING ULTRAVIOLET LIGHT EXPOSURE IN AN ENVIRONMENT

(71) Applicant: The Boeing Company, Huntington Beach, CA (US)

(72) Inventors: Jonathan B. Vance, St. Louis, MO (US); Ali Salour, Fenton, MO (US); James W. Fonda, Summerville, SC (US)

(73) Assignee: The Boeing Company, Chicago, IL (US)

( * ) Notice: Subject to any disclaimer, the term of this patent is extended or adjusted under 35 U.S.C. 154(b) by 143 days.

(21) Appl. No.: 14/591,269

(22) Filed: Jan. 7, 2015

(65) Prior Publication Data

US 2016/0195427 A1    Jul. 7, 2016

(51) Int. Cl.
*G01J 1/42* (2006.01)
*G01J 1/02* (2006.01)

(52) U.S. Cl.
CPC ............ *G01J 1/429* (2013.01); *G01J 1/0219* (2013.01)

(58) Field of Classification Search
None
See application file for complete search history.

(56) References Cited

U.S. PATENT DOCUMENTS

2015/0086420 A1* 3/2015 Trapani .................. A61L 2/202
422/24

* cited by examiner

*Primary Examiner* — Yara B Green
(74) *Attorney, Agent, or Firm* — DASCENZO Intellectual Property Law, P.C.

(57) ABSTRACT

Systems and methods for monitoring ultraviolet (UV) light exposure in an environment are disclosed herein. The methods include detecting a UV light intensity within an environment at a plurality of spaced apart node locations and calculating a UV light intensity map based upon the UV light intensity at the plurality of spaced apart node locations. The systems include a distributed UV light exposure monitoring system that includes a plurality of UV detection nodes, a receiver, and a data analysis system. Each of the plurality of UV detection nodes includes a UV sensor configured to detect a UV light intensity at a node location and a transmitter configured to generate a UV intensity signal that is indicative of the UV light intensity. The data analysis system is programmed to calculate a UV light intensity map of the environment.

20 Claims, 3 Drawing Sheets

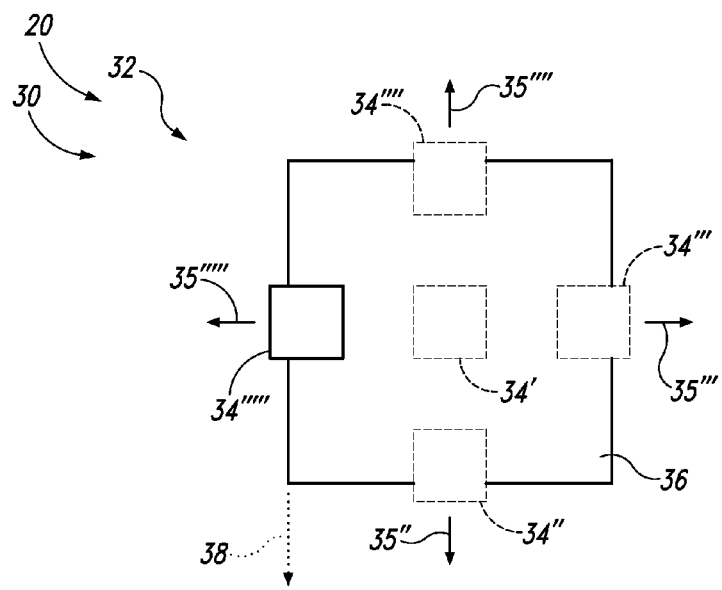
Fig. 2
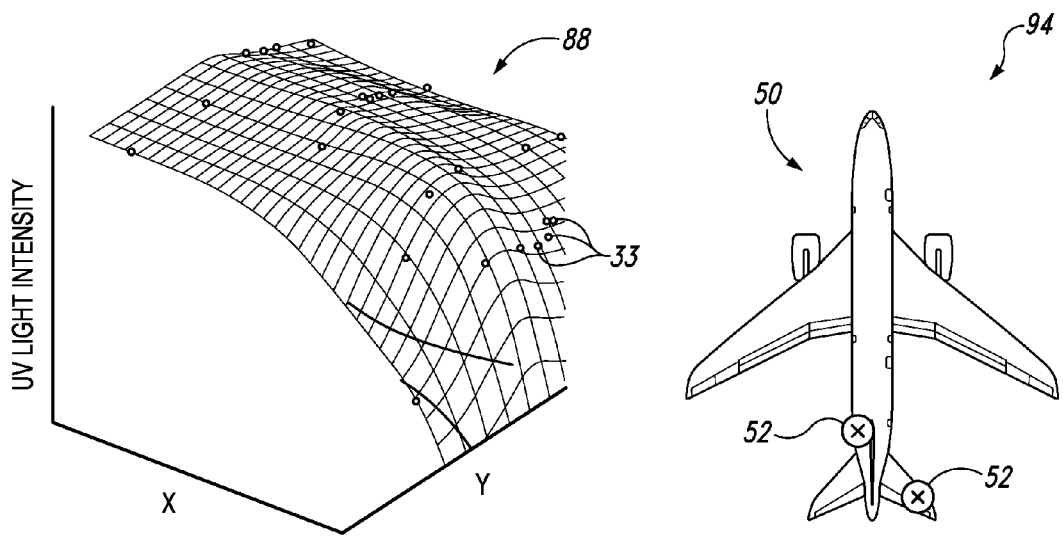
Fig. 3
Fig. 4

SYSTEMS AND METHODS FOR MONITORING ULTRAVIOLET LIGHT EXPOSURE IN AN ENVIRONMENT

FIELD

The present disclosure relates to systems and methods for monitoring ultraviolet light exposure, and more particularly to systems and methods for monitoring exposure of composite structures to ultraviolet light.

BACKGROUND

Certain manufactured components, such as composite structures, may be susceptible to degradation that may be caused by exposure to ultraviolet (UV) light. Thus, environments that contain the manufactured components, such as environments where manufactured components, such as composite structures, are fabricated, may be designed to limit exposure of the manufactured components to UV light. As an example, the environments may be designed to restrict, or block, natural light from being incident upon the manufactured components. As another example, the environments may include UV filters that may remove UV light from the natural light and/or from artificially produced light that may include UV components, to produce filtered light that may not cause degradation of the manufactured components.

While these environments may be effective at reducing exposure of the manufactured components to UV light, it may be difficult and/or cost-prohibitive to reduce UV exposure to negligible amounts. As an example, open doorways may permit UV light to enter the environment. As another example, the UV filters may degrade with time, causing the filtered light to include a progressively greater intensity of UV light. Thus, there exists a need for improved systems and methods for monitoring ultraviolet light exposure in an environment.

SUMMARY

Systems and methods for monitoring ultraviolet (UV) light exposure are disclosed herein. The methods include detecting, with a plurality of UV detection nodes, a UV light intensity within an environment at a plurality of spaced apart node locations. The methods also include generating a plurality of UV intensity signals with the plurality of UV detection nodes and transmitting the plurality of UV intensity signals to a data analysis system with a plurality of transmitters. The methods further include receiving, with a receiver, the plurality of UV intensity signals and determining, with the data analysis system, the UV light intensity at the plurality of spaced apart node locations. The methods also include calculating, with the data analysis system, a UV light intensity map of the environment. The UV light intensity map is calculated based upon the UV light intensity at the plurality of spaced apart node locations.

The systems include a distributed UV light exposure monitoring system. The monitoring system includes a plurality of spaced apart UV detection nodes, a receiver, and a data analysis system. Each of the plurality of spaced apart UV detection nodes includes a UV sensor configured to detect a UV light intensity at a node location. Each of the plurality of spaced apart UV detection nodes also includes a transmitter configured to generate a UV intensity signal that is indicative of the UV light intensity at the node location. The receiver is configured to receive the UV intensity signal from the plurality of UV detection nodes. The data analysis system is programmed to analyze the UV intensity signal from the plurality of UV detection nodes. The data analysis system further is programmed to determine the UV light intensity at the node locations based upon the UV intensity signal from the plurality of UV detection nodes. The data analysis system also is programmed to calculate a UV light intensity map of the environment. The UV light intensity map is calculated based upon the UV light intensity at the node locations.

BRIEF DESCRIPTION OF THE DRAWINGS

FIG. 2 is a schematic representation of examples of a UV detection node according to the present disclosure.

FIG. 3 is a schematic three-dimensional UV light intensity map that may be generated utilizing the systems and methods according to the present disclosure.

FIG. 4 is a schematic top view of a manufactured component, in the form of an aircraft, that may be monitored utilizing the systems and methods according to the present disclosure.

DESCRIPTION

Figure 1:
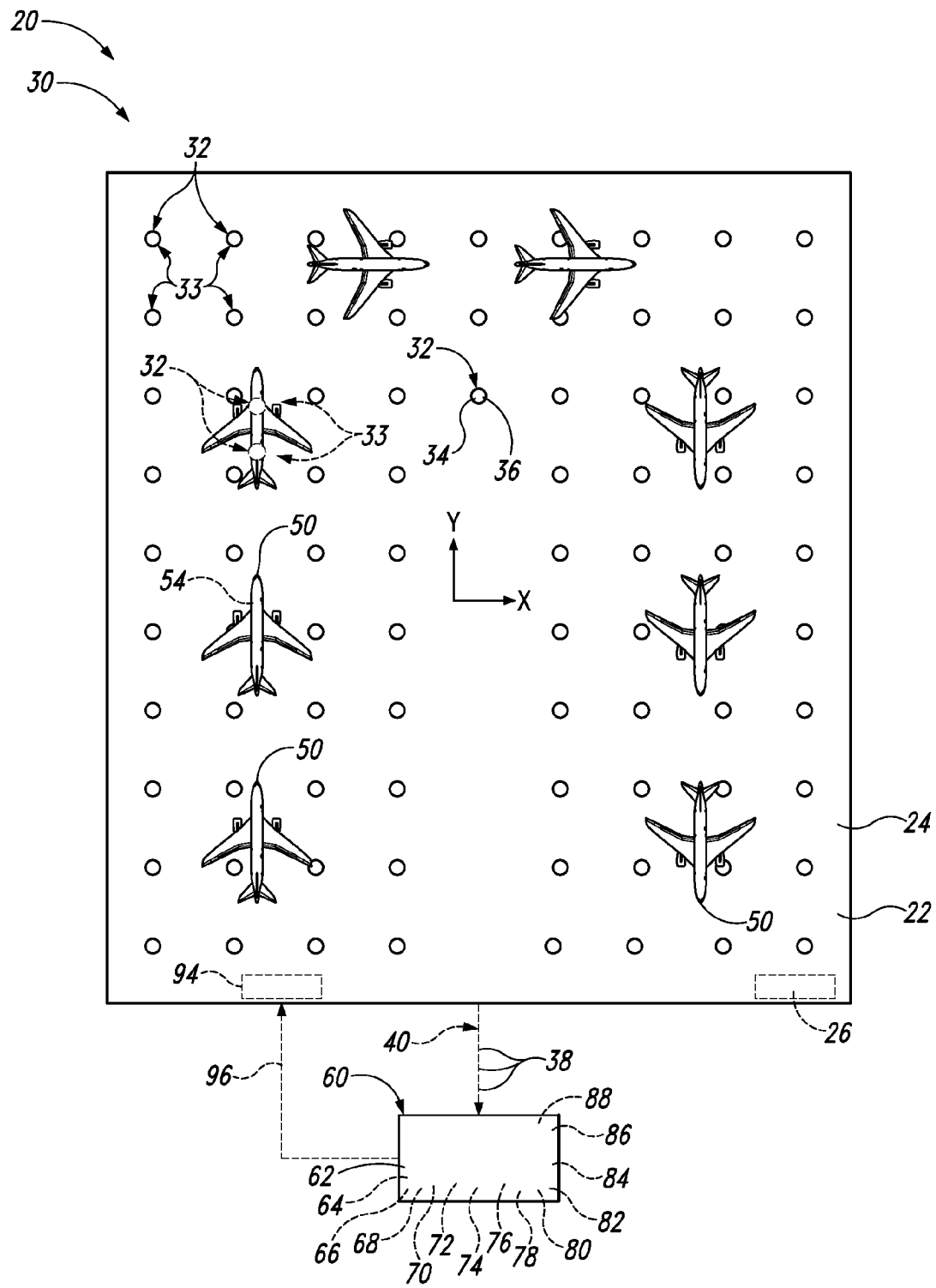
FIG. 1 is a schematic top view of an environment that may include a distributed ultraviolet (UV) light exposure monitoring system according to the present disclosure.

FIGS. 1-5 provide examples of distributed ultraviolet (UV) light exposure monitoring systems 30, according to the present disclosure, of environments 20 that include monitoring systems 30, of components of monitoring systems 30, and/or of methods 100, according to the present disclosure, of monitoring UV light intensity within an environment to determine the exposure of manufactured structures within the environment to ultraviolet light. The composite structures may be individual components or "parts," or may be assembled systems such as vehicles, for example, an aircraft. Elements that serve a similar, or substantially similar, purpose are labeled with like numbers in each of FIGS. 1-5, and these elements may not be discussed in detail herein with reference to each of FIGS. 1-5. Similarly, all elements may not be labeled in each of FIGS. 1-5, but reference numerals associated therewith may be utilized herein for consistency. Elements, components, and/or features that are discussed herein with reference to one or more of FIGS. 1-5 may be included in and/or utilized with any of FIGS. 1-5 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is a schematic top view of an environment 20 that may include a distributed ultraviolet (UV) light exposure monitoring system 30 according to the present disclosure. Environment 20 may include and/or be an at least partially, or even completely, enclosed space 22 that may house, contain, store, and/or be utilized during the manufacture of one or more manufactured components 50. Manufactured components 50 may be formed from materials that may be damaged by, may be degraded by, and/or otherwise may be sensitive to exposure to UV light, or exposure to greater than a certain dose of UV light.

As used herein, the words "exposure" or "exposed," or the phrase "exposure to UV light," indicate contact with UV light. Thus, if an element is exposed to UV light, it means that UV light has contacted and/or has been incident upon the element.

As used herein, the word "intensity" or the phrase "intensity of UV light" indicates an instantaneous magnitude, or brightness, of the UV light. Thus, if an element is exposed to UV light of a given intensity, it means that UV light of the given intensity has contacted and/or been incident upon the element. Light intensity may be measured and/or quantified utilizing the SI unit candela (cd), though this is not required.

As used herein, the word "dose" or the phrases "UV dose" or "UV light dose" are utilized to indicate the total, or cumulative, amount of UV light to which an element has been exposed. Dose generally is calculated from the product of the UV light intensity to which the element is exposed and the time during which the element is exposed to the UV light intensity (i.e., the UV light intensity multiplied by the time and/or the area under a UV light intensity vs. time curve); however, this is not required. UV light dose may be measured and/or quantified in candela*seconds (cd*s).

Environment 20 may be configured to reduce, limit, restrict, and/or block exposure of manufactured components 50 to UV light. As an example, environment 20 may be configured to restrict entry of sunlight thereinto. As another example, environment 20 may include one or more UV filters 24. UV filters 24 may be configured to decrease an intensity of UV light within a light that illuminates environment 20 and/or enclosed space 22 thereof. As an example, UV filters 24 may decrease the intensity of UV light in sunlight that may illuminate environment 20. As another example, UV filters 24 may decrease the intensity of UV light in electrically generated light that may illuminate environment 20.

However, UV filters 24 may not be 100% effective at removing UV light from the light that illuminates environment 20. Additionally or alternatively, UV filters 24 may degrade with time, thereby permitting progressively larger quantities of UV light to enter environment 20. In addition, a door and/or window may be left open, thereby permitting unfiltered sunlight to enter environment 20.

Regardless of the source or amount of UV light that enters or is present within environment 20, illumination of manufactured components 50 with the UV light may be detrimental to the performance of manufactured components 50. Thus, environment 20 may include and/or utilize distributed ultraviolet light exposure monitoring system 30 according to the present disclosure. Distributed ultraviolet (UV) light exposure monitoring system 30 also may be referred to herein as exposure monitoring system 30, as monitoring system 30, and/or as system 30. System 30 may be configured to monitor, detect, and/or quantify UV light intensity within environment 20 and/or to monitor, detect, quantify, and/or calculate UV light intensity and/or dose experienced by manufactured components 50 that are present within environment 20.

System 30 may include a plurality of UV detection nodes 32. "Plurality" as used herein means at least two UV detection nodes. UV detection nodes 32 also may be referred to herein as detection nodes 32 and/or as nodes 32 and may be spaced apart at a plurality of different node locations 33 within environment 20. The plurality of UV detection nodes 32 may include any suitable number of nodes 32 that may be spaced apart at any suitable number of corresponding node locations 33 within environment 20. As examples, the plurality of UV detection nodes 32 may include at least 2, at least 3, at least 4, at least 5, at least 6, at least 8, at least 10, at least 15, at least 20, at least 30, at least 40, or at least 50 UV detection nodes 32 and corresponding node locations 33.

As discussed in more detail herein with reference to FIG. 2, UV detection nodes 32 may include a UV sensor 34 and a transmitter 36. UV sensor 34 may be configured to detect a UV light intensity that may be incident thereonto. Thus, each UV sensor 34 of each detection node 32 may detect a respective UV light intensity at a respective, or corresponding, node location 33 that is associated with each detection node 32. Transmitter 36 may be configured to generate a UV intensity signal 38 that is indicative of the UV light intensity that is detected by the corresponding UV sensor 34. Thus, each transmitter 36 of each detection node 32 may generate a respective UV intensity signal 38 that is indicative of the UV light intensity at the respective, or corresponding, node location 33 that is associated with the transmitter 36, that is associated with the corresponding UV sensor 34, and/or that is associated with the detection node 32 that includes the transmitter 36.

System 30 also includes a receiver 62. Receiver 62 is configured to receive the respective UV intensity signal 38 from the plurality of UV detection nodes 32. As an example, transmitter 36 may include and/or be a wireless transmitter that is configured to generate a wireless UV intensity signal 38. Under these conditions, receiver 62 may include and/or be a wireless receiver that is configured to receive wireless UV intensity signal 38. As another example, transmitter 36 may include and/or be a wired transmitter that is configured to generate a wired UV intensity signal 38 and/or to convey wired UV intensity signal 38 via a wired connection 40. Under these conditions, receiver 62 may include and/or be a wired receiver that is configured to receive wired UV intensity signal 38 and/or to receive wired UV intensity signal 38 via wired connection 40.

System 30 further includes a data analysis system 60. Data analysis system 60 may be adapted, configured, designed, constructed, and/or programmed to analyze the respective UV intensity signal 38 from the plurality of UV detection nodes 32 and/or to determine the respective UV light intensity, or a parameter that is indicative of the respective UV light intensity, at each respective node location 33 based upon the respective UV intensity signal 38 from the plurality of UV detection nodes 32.

UV detection nodes 32 may include any suitable structure that includes UV sensor 34 and transmitter 36. It is within the scope of the present disclosure that each node 32 may be configured to continuously, or substantially continuously, determine the respective UV light intensity at the respective node location 33 of the respective node 32. Additionally or alternatively, each node 32 may determine the respective UV light intensity with at least a threshold detection frequency. Examples of the threshold detection frequency include frequencies of at least once per 1 second interval, at least once per 5 second interval, at least once per 10 second interval, at least once per 30 second interval, at least once per 1 minute interval, at least once per 5 minute interval, at least once per 10 minute interval, at least once per 15 minute interval, at least once per 30 minute interval, at least once per 1 hour interval, at least once per 2 hour interval, at least once per 4 hour interval, at least once per 6 hour interval, at least once per 9 hour interval, and/or at least once per 12 hour interval.

Nodes 32 may be spaced apart from one another within environment 20 in any suitable manner. As an example, nodes 32 may be spaced apart in a two-dimensional array (i.e., in at least two dimensions), as illustrated in FIG. 1. Under these conditions, nodes 32 may be referred to herein as forming a two-dimensional detection node array. As another example, nodes 32 may be spaced apart in a three-dimensional array (i.e., in three dimensions). Under these conditions, nodes 32 may be referred to herein as forming a three-dimensional detection node array.

Nodes 32 also may be spaced apart from one another within environment 20 with any suitable relative spacing, average spacing, minimum separation distance, and/or maximum separation distance. As an example, each node 32 may be spaced apart from a nearest other node 32 by at least a threshold node spacing distance. Examples of the threshold node spacing distance include distances of at least 1 meter, at least 2.5 meters, at least 5 meters, at least 7.5 meters, and/or at least 10 meters. Additionally or alternatively, the threshold node spacing distance may be less than 30 meters, less than 25 meters, less than 20 meters, less than 15 meters, less than 10 meters, and/or less than 5 meters.

Some, or even all, node locations 33 may be fixed, or substantially fixed, within environment 20. As an example, nodes 32 may be operatively attached to fixed structures, such as walls, posts, supports, and/or ceilings within environment 20. However, one or more node locations 33 may not be fixed within environment 20. As an example, monitoring system 30 may include one or more mobile UV detection nodes 32 that may be configured to translate and/or move within environment 20. As a more specific example, and as illustrated in dashed lines in FIG. 1, one or more mobile UV detection nodes 32 may be associated with, affixed to, and/or operatively attached to a given manufactured component 50 and may be configured to translate within environment 20 with a given manufactured component 50 while a given manufactured component 50 is located within environment 20. This may permit mobile UV detection node 32 to detect and/or quantify UV light exposure of a given manufactured component 50.

Nodes 32 may include any suitable number of sensors 34. As examples, nodes 32 may include a single sensor 34 or a plurality of sensors 34. When nodes 32 include the plurality of sensors 34, each node 32 may include 2, 3, 4, 5, or more than 5 sensors 34.

When a node 32 includes the plurality of sensors 34, the sensors 34 may be arranged within node 32 with any suitable orientation and/or relative orientation. As an example, and as illustrated in FIG. 2, a first sensor 34' may face in a first direction (i.e., into or out of the page), a second sensor 34" may face in a second direction 35", a third sensor 34''' may face in a third direction 35''', a fourth sensor 34'''' may face in a fourth direction 35'''', and/or a fifth sensor 34''''' may face in a fifth direction 35'''''. These various directions may be opposed, or substantially opposed, to one another (see, for example, second direction 35" and fourth direction 35'''') and/or perpendicular, or substantially perpendicular, to one another (see, for example, second direction 35" and third direction 35'''). As a more specific example, node 32 may be located vertically above a floor and/or ground level of environment 20. Under these conditions, the first direction may face toward, or substantially toward, and/or perpendicular to the floor and second direction 35", third direction 35''', fourth direction 35'''', and/or fifth direction 35''''' may face parallel to the floor.

Regardless of the exact relative orientation, or relative orientation, of sensors 34 within a given node 32, the distribution in different sensor orientations may permit sensors 34 to have an increased sensitivity to light that is incident thereonto from a given direction. This may permit nodes 32 that include a plurality of sensors 34 to exhibit an increased sensitivity to a location of a source of UV light that may be present within environment 20.

Returning to FIG. 1, data analysis system 60 may include any suitable structure that may be programmed to analyze respective UV intensity signals 38 from each node 32 and/or to determine the respective UV light intensity at each node 32 based upon the respective UV intensity signal 38. Examples of data analysis system 60 include any suitable electronic controller, dedicated computer, special-purpose computer, and/or personal computer.

Data analysis system 60 additionally or alternatively may be programmed to calculate a UV light intensity map 88 of environment 20, as illustrated in FIG. 3. Such a UV light intensity map may plot, illustrate, and/or quantify UV light intensity within environment 20 as a function of location (i.e., x and y-coordinates) within environment 20.

Data analysis system 60 may calculate UV light intensity map 88 based, at least in part, on the respective UV light intensity at the respective node locations 33. As an example, UV light intensity map 88 may plot the UV light intensity at node locations 33 of FIG. 1. This is illustrated by the open circles in FIG. 3. Additionally or alternatively, data analysis system 60 may be programmed to interpolate the UV light intensity between respective node locations 33. This is illustrated by the three-dimensional surface grid that is plotted in FIG. 3. Data analysis system 60 may interpolate and/or calculate UV light intensity within environment 20 at one or more location(s) that may be spaced apart from and/or different from node locations 33 of FIG. 1. This may permit data analysis system 60 to calculate, estimate, and/or approximate the UV light intensity at any given location, or even at every location, within environment 20 even when system 30 only includes a finite number of nodes 32 that physically detect the UV light intensity at a finite number of node locations 33.

When data analysis system 60 calculates UV light intensity map 88 (as illustrated in FIG. 3), data analysis system 60 may be programmed to calculate UV light intensity map 88 as a function of time within environment 20. This may include calculating a plurality of different UV light intensity maps 88, with the plurality of different UV light intensity maps providing a quantitative measure of UV light intensity as a function of both location and time within environment 20.

Returning to FIG. 1, environment 20 further may include a manufactured component tracking system 26. Manufactured component tracking system 26 may be configured to track a location of one or more manufactured components 50 within environment 20 and/or to provide the location of one or more manufactured components 50 to data analysis system 60. As an example, each manufactured component 50 may include and/or have attached thereto a unique identifier 54. Unique identifier 54 may be different for each manufactured component 50 that is present within environment 20 and may be utilized to track the location of each manufactured component 50. As examples, unique identifier 54 may include and/or be an RFID tag, an RFID reader, a location transmitter, and/or a visual indicator that may be tracked manually and/or by manufactured component tracking system 26.

Data analysis system 60 further may be programmed to correlate UV light intensity map 88 with a location of a given manufactured component 50 within environment 20, such as to determine and/or quantify the exposure of manufactured components 50 to the UV light. Under these conditions, data analysis system 60 may be programmed to determine a UV dose experienced by given manufactured component 50, such as while given manufactured component 50 is located within environment 20. The calculated UV dose may be based at least in part, on the location of given manufactured component 50 within environment 20 and on the UV light intensity at that location, such as may be as determined by UV light intensity map 88 and/or by the respective UV light intensity at each node location. This may permit system 30 to track the UV dose of manufactured components 50 and/or to notify an operator when the UV dose of given manufactured component 50 exceeds a predetermined threshold UV dose, such as via utilizing a notification system 94, which is discussed in more detail herein.

System 30 and/or data analysis system 60 may be adapted, configured, designed, constructed, and/or programmed to analyze the respective UV intensity signals 38, to determine the respective UV light intensity at node locations 33, and/or to calculate UV light intensity map 88 in any suitable manner. As an example, system 30 and/or data analysis system 60 may be programmed to perform methods 100, which are discussed in more detail herein. As another example, system 30 may include a data storage device 64. Data storage device 64 may be configured to store the respective UV light intensity at the respective node locations 33, to store the respective node locations 33, and/or to associate the respective node locations 33 with the respective UV light intensity. As yet another example, data storage device 64 also may be configured to store a respective time stamp for the respective UV light intensity at the respective node locations.

Data analysis system 60 may include any suitable structure that may be configured to receive the respective UV intensity signals 38, to determine the respective UV light intensity at the respective node locations based upon respective UV intensity signals 38, to control the operation of at least a portion of system 30, and/or to perform methods 100. As an example, data analysis system 60 may include a communications framework 66. Communications framework 66 may provide communications between a processor unit 68, a memory 70, persistent storage 72, a communications unit 74, an input/output (I/O) unit 76, and/or a display 78. Memory 70, persistent storage 72, communications unit 74, input/output (I/O) unit 76, and display 78 are examples of resources accessible by processor unit 68 via communications framework 66.

Processor unit 68 serves to run instructions that may be loaded into memory 70. Processor unit 68 may include a number of processors, a multi-processor core, or some other type of processor, depending on the particular implementation. Further, processor unit 68 may be implemented using a number of heterogeneous processor systems in which a main processor is present with secondary processors on a single chip. As another illustrative example, processor unit 68 may be a symmetric multi-processor system containing multiple processors of the same type.

Memory 70 and persistent storage 72 are examples of data storage devices 64. A data storage device 64 is any piece of hardware that is capable of storing information, such as, for example, without limitation, data, program code in functional form, and other suitable information either on a temporary basis or a permanent basis.

Data storage devices 64 also may be referred to herein as computer readable storage devices and/or as computer readable storage media 84 in these examples. Memory 70, in these examples, may be, for example, a random access memory or any other suitable volatile or non-volatile storage device. Persistent storage 72 may take various forms, depending on the particular implementation.

For example, persistent storage 72 may contain one or more components or devices. For example, persistent storage 72 may be a hard drive, a flash memory, a rewritable optical disk, a rewritable magnetic tape, or some combination of the above. The one or more components or devices used by persistent storage 72 also may be removable. For example, a removable hard drive may be used for persistent storage 72.

Communications unit 74, in these examples, provides for communications with other data processing systems or devices. In these examples, communications unit 74 may be a network interface card. Communications unit 74 may provide communications through the use of either or both physical and wireless communications links.

Input/output (I/O) unit 76 allows for input and output of data with other devices that may be connected to data analysis system 60. For example, input/output (I/O) unit 76 may provide a connection for user input through a keyboard, a mouse, and/or some other suitable input device. Further, input/output (I/O) unit 76 may send output to a printer, to display 78, and/or to notification system 94. Display 78 provides a mechanism to display information to a user.

Instructions for the operating system, applications, and/or programs may be located in data storage devices 64, which may be in communication with processor unit 68 through communications framework 66. The instructions may be in a functional form on persistent storage 72. These instructions may be loaded into memory 70 for execution by processor unit 68. Processes of the different embodiments may be performed by processor unit 68 using computer-implemented instructions, which may be located in a memory, such as memory 70.

These instructions are referred to as program instructions, a program code 80, computer usable program code, or computer readable program code that may be read and executed by a processor in processor unit 68. The program code in the different embodiments may be located, stored, and/or embodied on different physical or computer readable storage media, such as memory 70 or persistent storage 72. Program code 80 may be located in a functional form on computer readable media 82 that may be selectively removable and may be loaded onto or transferred to data analysis system 60 for execution by processor unit 68. Program code 80 and computer readable media 82 may form a computer program product in these examples. In one example, computer readable media 82 may be computer readable storage media 84 or computer readable signal media 86.

Computer readable storage media 84 may include, for example, an optical or magnetic disk that is inserted or placed into a drive or other device that is part of persistent storage 72 for transfer onto a storage device, such as a hard drive, that is part of persistent storage 72. Computer readable storage media 84 also may take the form of persistent storage, such as a hard drive, a thumb drive, or a flash memory, that is connected to data analysis system 60. In some instances, computer readable storage media 84 may not be removable from data analysis system 60.

Computer readable storage media 84 are physical or tangible storage devices used to store program code 80 rather than media that propagate or transmit program code 80. Computer readable storage media 84 also are referred to as computer readable tangible storage devices or computer readable physical storage devices. In other words, computer readable storage media 84 are media that can be touched by a person.

Alternatively, program code 80 may be transferred to data analysis system 60 using computer readable signal media 86. Computer readable signal media 86 may be, for example, propagated data signals containing program code 80. For example, computer readable signal media 86 may be electromagnetic signals, optical signals, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 80 may be downloaded over a network to persistent storage 72 from another device or data processing system through computer readable signal media 86 for use within data analysis system 60. For instance, program code stored in a computer readable storage medium in a server data processing system may be downloaded over a network from the server to data analysis system 60. The data processing system providing program code 80 may be a server computer, a client computer, or some other device capable of storing and transmitting program code 80.

The different components illustrated for data analysis system 60 are not meant to provide architectural limitations to the manner in which different embodiments may be implemented. The different illustrative embodiments may be implemented in a data processing system including components in addition to and/or in place of those illustrated for data analysis system 60. Other components shown in FIG. 1 can be varied from the illustrative examples shown. The different embodiments may be implemented using any hardware device or system adapted, configured, designed, constructed, and or programmed to run program code 80. As one example, data analysis system 60 may include organic components integrated with inorganic components and/or may be comprised entirely of organic components excluding a human being. For example, a storage device may be comprised of an organic semiconductor.

In another illustrative example, processor unit 68 may take the form of a hardware unit that has circuits that are manufactured or configured for a particular use. This type of hardware may perform operations without needing program code to be loaded into a memory from a storage device to be configured to perform the operations.

For example, when processor unit 68 takes the form of a hardware unit, processor unit 68 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 80 may be omitted, because the processes for the different embodiments are implemented and/or embedded in a hardware unit.

In still another illustrative example, processor unit 68 may be implemented using a combination of processors found in computers and hardware units. Processor unit 68 may have a number of hardware units and a number of processors that are configured to run program code 80. With this example, some of the processes may be implemented and/or embedded in the number of hardware units, while other processes may be implemented in the number of processors.

In another example, a bus system may be used to implement communications framework 66 and may be comprised of one or more buses, such as a system bus or an input/output bus. Of course, the bus system may be implemented using any suitable type of architecture that provides for a transfer of data between different components or devices attached to the bus system.

Additionally, communications unit 74 may include a number of devices that transmit data, receive data, or both transmit and receive data. Communications unit 74 may be, for example, a modem or a network adapter, two network adapters, or some combination thereof. Further, communications unit 74 may include a memory that may be, for example, memory 70, or a cache, such as that found in an interface and memory controller hub that may be present in communications framework 66.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

As discussed, system 30 may include notification system 94. Notification system 94 may be configured to notify a user when a given manufactured component 50 has received a UV dose that exceeds a predetermined threshold UV dose. As an example, data analysis system 60 may be configured to generate a dose indication signal 96 when the UV dose of the manufactured component is greater than the predetermined threshold UV dose. Notification system 94 may receive dose indication signal 96 and, responsive to receipt of dose indication signal 96, may notify the user that the UV dose exceeds the predetermined threshold UV dose. As a more specific example, and as illustrated in FIG. 4, notification system 94 may notify the user of one or more high UV exposure regions 52 on manufactured components 50. Examples of notification system 94 include any suitable alert mechanism, including any suitable alarm, buzzer, light, color-coded display, graphical display, and/or alphanumeric display that is indicative of the UV dose being greater than the threshold UV dose. As an additional example, notification system 94 may display a graphical image of manufactured components 50, such as is illustrated in FIG. 4.

The predetermined threshold UV dose may include and/or be any suitable UV dose for manufactured components 50. As an example, the predetermined threshold UV dose may be less than, or a fraction of, a rework UV dose for the manufactured component. As used herein, the phrase "rework UV dose" may refer to a UV dose above which a process may be required to be performed on the manufactured components and/or above which there is significant, detected, and/or greater than a threshold amount of degradation of the manufactured components due to the exposure to UV light. Thus, the presence of notification system 94 may assist a user in recognizing and/or responding to UV doses that approach the rework UV dose, thereby decreasing a need for the rework process to be performed.

Environment 20 may include and/or be any suitable environment in which UV light exposure may be a concern, in which UV light intensity and/or exposure is to be monitored and/or quantified, and/or in which manufactured components 50 that are sensitive to UV light exposure are manufactured. As examples, environment 20 may include and/or be a manufacturing environment and/or a composite part manufacturing facility. Under these conditions, manufactured components 50 may include and/or be a composite part. As another example, environment 20 may include and/or be a composite aircraft manufacturing facility. Under these conditions, manufactured components 50 may include and/or be a composite aircraft or at least a portion of the composite aircraft. It is within the scope of the present disclosure that environment 20 may include and/or be enclosed space 22. Additionally or alternatively, environment 20 also may include and/or be an at least partially, or even completely, open, or outdoor, space and/or environment. Examples of such open, our outdoor, spaces, or environments, include an outdoor flight line, a shipping area, a receiving area, a part supply chain, an airport, a rail terminal, a train, and/or any other suitable environment through which manufactured components 50 may be conveyed, transported, and/or moved during manufacture thereof.

Figure 5:
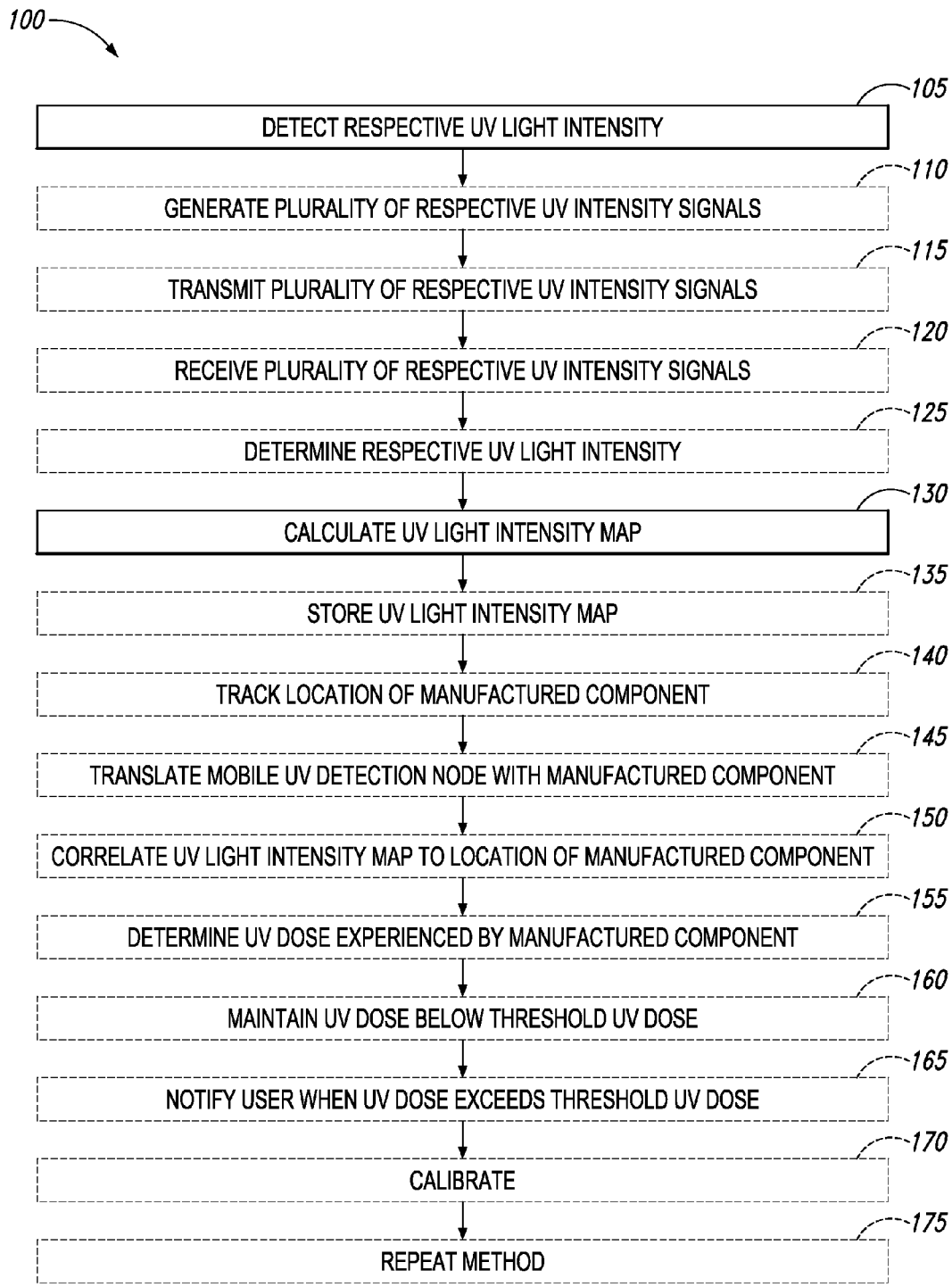
FIG. 5 is a flowchart depicting methods, according to the present disclosure, of generating an ultraviolet light intensity map within an environment.

FIG. 5 is a flowchart depicting methods 100, according to the present disclosure, of generating an ultraviolet light intensity map within an environment. Methods 100 include detecting a respective UV light intensity at 105 and may include generating a plurality of respective UV intensity signals at 110, transmitting the plurality of respective UV intensity signals at 115, receiving the plurality of respective UV intensity signals at 120, and/or determining the respective UV light intensity at 125. Methods 100 further include calculating a UV light intensity map at 130 and may include storing the UV light intensity map at 135, tracking a location of a manufactured component at 140, translating a mobile UV detection node with the manufactured component at 145, and/or correlating the UV light intensity map to the location of the manufactured component at 150. Methods 100 further may include determining a UV dose experienced by the manufactured component at 155, maintaining the UV dose below a threshold UV dose at 160, notifying a user when the UV dose exceeds the threshold UV dose at 165, calibrating at 170, and/or repeating at least a portion of the methods at 175.

Detecting the respective UV light intensity at 105 may include detecting the respective UV light intensity at a plurality of spaced apart node locations within the environment. As an example, the detecting at 105 may include detecting with a distributed UV light exposure monitoring system, such as system 30 of FIGS. 1-2, that may include a plurality of spaced apart UV detection nodes, such as nodes 32 of FIGS. 1-2. Under these conditions, the detecting at 105 may include detecting with the plurality of spaced apart UV detection nodes.

The detecting at 105 may include continuously, or substantially continuously, detecting the respective UV light intensity. Additionally or alternatively, the detecting at 105 also may include detecting with at least a threshold detection frequency. Examples of the threshold detection frequency are disclosed herein. The detecting at 105 may include simultaneously, or substantially simultaneously, detecting the respective UV light intensity at the plurality of spaced apart node locations and/or with the plurality of spaced apart UV detection nodes.

As discussed herein, the UV detection nodes may include a first UV sensor that faces in a first direction and a second UV sensor that faces in a second direction. The first direction may be opposed, or substantially opposed, to the second direction. Additionally or alternatively, the first direction may be perpendicular, or substantially perpendicular, to the second direction. As an example, the UV detection nodes may be located vertically above a floor of the environment. Under these conditions, the first direction may face toward, or perpendicular to, the floor, while the second direction may face parallel to the floor.

When the UV detection nodes include the first UV sensor and the second UV sensor, the detecting at 105 may include detecting a first respective UV light intensity with the first UV sensor and also detecting a second respective UV light intensity with the second UV sensor. Under these conditions, the calculating at 130 may include calculating based, at least in part, on the first respective UV light intensity and on the second respective UV light intensity. Such a UV detection node may improve an accuracy of the UV light intensity map that is created during the calculating at 130 and/or may increase an ability of methods 100 to determine, approximate, and/or calculate a location of one or more source(s) of UV light within the environment.

Generating the plurality of respective UV intensity signals at 110 may include generating with the plurality of UV detection nodes. As an example, each UV detection node may include electronic hardware that may, or may be utilized to, generate a respective UV intensity signal, and the respective UV intensity signal may be based upon and/or indicative of the UV light intensity that is detected by the UV detection node. The UV light intensity may be measured and/or determined during the determining at 105.

Transmitting the plurality of respective UV intensity signals at 115 may include transmitting a respective UV intensity signal from the plurality of UV detection nodes and/or transmitting to a data analysis system that may form a portion of the distributed UV light exposure monitoring system. Additionally or alternatively, the transmitting at 115 may include transmitting with a respective transmitter that forms a portion of each of the UV detection nodes. The transmitting at 115 may include wirelessly transmitting at least a portion of the plurality of respective UV intensity signals. The transmitting at 115 also may include transmitting at least a portion of the plurality of respective UV intensity signals via a wired connection.

Receiving the plurality of respective UV intensity signals at 120 may include receiving with the data analysis system. When the transmitting at 115 includes the wirelessly transmitting, the receiving at 120 may include wirelessly receiving the portion of the plurality of respective UV intensity signals. When the transmitting at 115 includes transmitting via the wired connection, the receiving at 120 may include receiving the portion of the plurality of respective UV intensity signals via the wired connection.

Determining the respective UV light intensity at 125 may include determining the respective UV light intensity at the plurality of spaced apart node locations and may be performed in any suitable manner. As an example, the determining at 125 may include determining with the data analysis system. As another example, the determining at 125 may include determining based, at least in part, on the plurality of respective UV intensity signals.

Calculating the respective UV light intensity map at 130 may include calculating based, at least in part, on the respective light intensity at the plurality of spaced apart node locations. The UV light intensity map may include and/or be a map of UV light intensity of, or within, the environment. The UV light intensity map may be calculated with, or utilizing, the data analysis system. The UV light intensity map may be calculated with, or utilizing, a neural network.

The calculating at 130 may include calculating in any suitable manner. As an example, the calculating at 130 may include interpolating the UV light intensity among the plurality of spaced apart node locations. This may include interpolating such that the UV light intensity map includes a UV light intensity, or a plurality of UV light intensities, within the environment at a location, or a plurality of locations, that is spaced apart from the plurality of node locations. Additionally or alternatively, this also may include interpolating such that the UV light intensity map includes a functional relationship that describes, or permits calculation of, the UV light intensity map over a continuous range of locations within the environment.

The calculating at 130 further may include calculating the UV light intensity map as a function of time. As an example, the calculating at 130 may include calculating a respective UV light intensity map for a plurality of times, or different times, and/or with at least the threshold detection frequency. As another example, the calculating at 130 may include calculating the UV light intensity at a given location for the plurality of times, or different times, and/or with at least the threshold detection frequency. Examples of the threshold detection frequency are disclosed herein. Methods 100 also may include displaying the respective UV light intensity map that is calculated during the calculating at 130.

Storing the UV light intensity map at 135 may include storing with, utilizing, or on a data storage device. Examples of the data storage device are disclosed herein. The storing at 135 may include storing UV light intensity as a function of location within the environment. Additionally or alternatively, the storing at 135 may include storing UV light intensity within the environment as a function of time. As yet another example, the storing at 135 also may include storing an interpolated UV light intensity as a function of location within the environment. As another example, the storing at 135 may include storing a functional relationship that describes, or permits calculation of, UV light intensity as a function of time and/or as a function of location within the environment.

Tracking the location of the manufactured component at 140 may include tracking in any suitable manner. As an example, the tracking at 140 may include maintaining a database, a data repository, and/or a log of the location of the manufactured component within the environment as a function of time. As another example, the tracking at 140 may include manually tracking the location of the manufactured component. As yet another example, the tracking at 140 may include automatically and/or electronically tracking the location of the manufactured component. As another example, the tracking at 140 may include utilizing a tracking transmitter, an RFID tag, and/or a unique identifier to track the location of the manufactured component within the environment. As yet another example, the tracking at 140 may include tracking with, or utilizing, manufactured component tracking system 26 of FIG. 1.

Translating the mobile UV detection node with the manufactured component at 145 may include translating and/or moving the mobile UV detection node within the environment. As an example, the mobile UV detection node may be operatively attached to the manufactured component and thus may translate with the manufactured component within the environment. As another example, the mobile UV detection node may be separate from the manufactured component but may be automatically and/or manually translated with the manufactured component within the environment. The translating at 145 may include translating such that the mobile UV detection node detects UV light exposure of the manufactured component at least while the manufactured component is located within the environment.

Correlating the UV light intensity map to the location of the manufactured component at 150 may include correlating to the location of the manufactured component within the environment. This may include correlating to determine, or to permit determining of, a UV dose experienced, or expected to be experienced, by the manufactured component while the manufactured component is located within the environment, such as during the determining at 155.

Determining the UV dose experienced by the manufactured component at 155 may include determining in any suitable manner. As an example, the determining at 155 may include determining based, at least in part, on the UV light intensity map. As another example, the determining at 155 may include determining based, at least in part, on the tracking at 140 and/or on the correlating at 150. As yet another example, the determining at 155 may include calculating a cumulative, or integrated, UV exposure of the manufactured component while the manufactured component is present within the environment.

Maintaining the UV dose below the threshold UV dose at 160 may include restricting and/or limiting UV exposure to maintain the UV dose experienced by, or incident upon, the manufactured component below the threshold UV dose. The maintaining at 160 may be based, at least in part, on the detecting at 105, the calculating at 130, and/or the determining at 155. As an example, the maintaining at 160 may include replacing a UV filter that is configured to filter light that illuminates the environment. This may decrease an intensity of UV light within the light that illuminates the environment, thereby decreasing subsequent UV exposure of the manufactured component. The UV filter may be replaced responsive to the detecting at 105 indicating that one or more of the UV detection nodes is detecting a UV intensity that is above a threshold UV intensity.

As another example, the maintaining at 160 may include decreasing exposure of the manufactured component to sunlight. This may include replacing the UV filter and/or closing one or more doors and/or windows that may permit sunlight to enter the environment.

As yet another example, the maintaining at 160 may include placing a UV light-opaque cover over the manufactured component. This may decrease UV light exposure of the manufactured component despite the presence UV light, or of elevated UV light intensities, within the environment.

Notifying the user when the UV dose exceeds the threshold UV dose at 165 may include notifying the user when the UV dose experienced, or expected to be experienced, by the manufactured component exceeds a predetermined threshold UV dose. The predetermined threshold UV dose generally will be less than a rework UV dose for the manufactured component. Thus, the notifying at 165 may permit the user to decrease subsequent UV light intensity that may be incident upon the manufactured component, or subsequent UV exposure of the manufactured component, such as via the maintaining at 160, to prevent the UV dose from exceeding the rework UV dose.

The notifying at 165 may be accomplished in any suitable manner. As an example, the notifying at 165 may include generating an alert. Generating the alert may include actuating an alarm, actuating a buzzer, powering a light, generating a color-coded display, generating a graphical display, and/or generating an alphanumeric display that is indicative of the UV dose being greater than the predetermined threshold UV dose. As another example, the notifying at 165 also may include notifying the user of a relative and/or absolute magnitude of the UV dose experienced by the manufactured component.

Calibrating at 170 may include calibrating the distributed UV light exposure monitoring system and/or one or more of the UV detection nodes thereof. This may include calibrating to improve an accuracy of the calculated UV light intensity map at, or near, the plurality of spaced apart node locations and/or at, or near, locations that are spaced apart from the node locations. The calibrating at 170 may be accomplished in any suitable manner. As an example, the calibrating at 170 may include measuring the UV light intensity with a calibration sensor at a location that is spaced apart from the plurality of node locations and comparing the measured UV light intensity to a UV light intensity at the location that is predicted by the UV light intensity map. As another example, the calibrating at 170 also may include measuring the UV light intensity with the calibration sensor at one or more of the plurality of spaced apart node locations and comparing the measured UV light intensity to the corresponding UV light intensity that is detected by the corresponding UV detection node. As yet another example, the calibrating at 170 may include applying a calibration, or correction, factor to the respective UV light intensity that is detected at one or more of the plurality of spaced apart node locations to improve the accuracy of the calculated UV light intensity map.

Repeating at least the portion of the methods at 175 may include repeating any suitable portion of methods 100 with any suitable sequence and/or in any suitable manner. As an example, the repeating at 175 may include periodically repeating at least the detecting at 105 and the calculating at 130 to calculate a plurality of different UV light intensity maps at a plurality of different times and/or to determine a chronological progression of UV light intensity within the environment.

Illustrative, non-exclusive examples of inventive subject matter according to the present disclosure are described in the following enumerated paragraphs:

A1. A method of monitoring ultraviolet (UV) light intensity within an environment, the method comprising:

detecting a respective UV light intensity within the environment at a plurality of spaced apart node locations; and calculating a UV light intensity map of the environment, wherein the calculating is based, at least in part, on the respective UV light intensity at the plurality of spaced apart node locations.

A2. The method of paragraph A1, wherein the detecting includes detecting with a distributed UV light exposure monitoring system that includes a plurality of UV detection nodes, wherein the plurality of UV detection nodes is spaced apart within the environment at the plurality of spaced apart node locations.

A3. The method of any of paragraphs A1-A2, wherein the detecting includes continuously, or substantially continuously, detecting.

A4. The method of any of paragraphs A1-A3, wherein the detecting includes detecting with at least a threshold detection frequency.

A5. The method of paragraph A4, wherein the threshold detection frequency is at least once per 1 second interval, at least once per 5 second interval, at least once per 10 second interval, at least once per 30 second interval, at least once per 1 minute interval, at least once per 5 minute interval, at least once per 10 minute interval, at least once per 15 minute interval, at least once per 30 minute interval, at least once per 1 hour interval, at least once per 2 hour interval, at least once per 4 hour interval, at least once per 6 hour interval, at least once per 9 hour interval, or at least once per 12 hour interval.

A6. The method of any of paragraphs A1-A5, wherein the detecting includes simultaneously, or substantially simultaneously, detecting the respective UV light intensity at the plurality of spaced apart node locations.

A7. The method of any of paragraphs A1-A6, wherein the detecting includes detecting with a/the plurality of UV detection nodes, wherein each of the plurality of UV detection nodes includes a UV sensor configured to detect the respective UV light intensity.

A8. The method of paragraph A7, wherein the UV sensor is a first UV sensor that faces in a first direction, wherein one or more of the plurality of UV detection nodes further includes a second UV sensor that faces in a second direction, and further wherein the first direction is at least one of (i) opposed, or substantially opposed, to the second direction and (ii) perpendicular, or substantially perpendicular, to the second direction.

A9. The method of paragraph A8, wherein the plurality of UV detection nodes is located vertically above a floor of the environment, wherein the first direction faces toward, or perpendicular to, the floor, and further wherein the second direction faces parallel to the floor.

A10. The method of any of paragraphs A8-A9, wherein the detecting includes detecting a first respective UV light intensity with the first UV sensor and detecting a second respective UV light intensity with the second UV sensor.

A11. The method of paragraph A10, wherein the calculating includes calculating based, at least in part, on the first respective UV light intensity and the second respective UV light intensity.

A12. The method of any of paragraphs A1-A11, wherein the calculating includes calculating with a data analysis system, optionally wherein the data analysis system includes a neural network.

A13. The method of any of paragraphs A1-A12, wherein the calculating includes interpolating the UV light intensity among the plurality of spaced apart node locations such that the UV light intensity map includes a UV light intensity within the environment at a location that is spaced apart from the plurality of node locations.

A14. The method of any of paragraphs A1-A13, wherein the calculating includes calculating the UV light intensity map within the environment as a function of time.

A15. The method of any of paragraphs A1-A14, wherein the calculating includes calculating with a/the neural network.

A16. The method of any of paragraphs A1-A15, wherein the method further includes correlating, optionally with the data analysis system, the UV light intensity map to a location of a manufactured component within the environment and determining, optionally with the data analysis system, a UV dose experienced, or to be experienced, by the manufactured component within the environment based, at least in part, on the correlating.

A17. The method of paragraph A16, wherein the method further includes tracking, optionally with a manufactured component tracking system, the location of the manufactured component within the environment, wherein the determining is based, at least in part, on the tracking.

A18. The method of any of paragraphs A16-A17, wherein the method further includes notifying a user when the UV dose experienced, or to be experienced, by the manufactured component exceeds a predetermined threshold UV dose.

A19. The method of paragraph A18, wherein the predetermined threshold UV dose is less than a rework UV dose for the manufactured component.

A20. The method of any of paragraphs A18-A19, wherein the notifying includes at least one of generating an alert, actuating an alarm, actuating a buzzer, powering a light, generating a color-coded display, generating a graphical display, and generating an alphanumeric display that is indicative of the UV dose experienced by the manufactured component being greater than the predetermined threshold UV dose.

A21. The method of any of paragraphs A16-A20, wherein the method further includes notifying a/the user of a magnitude of the UV dose experienced by the manufactured component.

A22. The method of any of paragraphs A1-A21, wherein the plurality of spaced apart node locations is fixed, or substantially fixed, within the environment.

A23. The method of any of paragraphs A1-A22, wherein a mobile UV detection node located at one of the plurality of spaced apart node locations is configured to translate within the environment, and further wherein the method includes translating the mobile UV detection node within the environment.

A24. The method of paragraph A23, wherein the translating includes translating the mobile UV detection node with a/the manufactured component such that the mobile UV detection node detects UV light exposure of the manufactured component.

A25. The method of any of paragraphs A1-A24, wherein the detecting the respective UV light intensity at the plurality of spaced apart node locations includes detecting with a/the plurality of UV detection nodes, wherein the calculating the UV light intensity map includes calculating the UV light intensity map with a/the data analysis system, and further wherein the method includes:

generating a plurality of respective UV intensity signals with the plurality of UV detection nodes, wherein each of the plurality of respective UV intensity signals is indicative of the respective UV light intensity at a respective one of the plurality of spaced apart node locations;

transmitting, with a plurality of respective transmitters, the plurality of respective UV intensity signals from the plurality of UV detection nodes to the data analysis system;

receiving, with a receiver, the plurality of respective UV intensity signals; and determining, with the data analysis system, the respective UV light intensity at the plurality of spaced apart node locations based, at least in part, on the plurality of respective UV intensity signals.

A26. The method of paragraph A25, wherein the transmitting includes wirelessly transmitting the plurality of respective UV intensity signals, and further wherein the receiving includes wirelessly receiving the plurality of respective UV intensity signals.

A27. The method of any of paragraphs A25-A26, wherein the transmitting includes transmitting the plurality of respective UV intensity signals via a wired connection, and further wherein the receiving includes receiving the plurality of respective UV intensity signals via the wired connection.

A28. The method of any of paragraphs A1-A27, wherein the method further includes calibrating to improve an accuracy of the calculated UV light intensity map.

A29. The method of paragraph A28, wherein the calibrating includes measuring UV light intensity at a/the location that is spaced apart from the plurality of node locations and comparing the measured UV light intensity to a UV light intensity that is predicted by the UV light intensity map.

A30. The method of any of paragraphs A28-A29, wherein the calibrating includes applying a calibration factor to the respective UV light intensity that is detected at one or more of the plurality of spaced apart node locations to improve the accuracy of the UV light intensity map.

A31. The method of any of paragraphs A1-A30, wherein the method further includes storing the UV light intensity map with a data storage device.

A32. The method of paragraph A31, wherein the storing includes storing UV light intensity as a function of location within the environment.

A33. The method of any of paragraphs A31-A32, wherein the storing includes storing UV light intensity within the environment as a function of time.

A34. The method of any of paragraphs A31-A33, wherein the storing includes storing an interpolated UV light intensity as a function of location within the environment.

A35. The method of any of paragraphs A1-A34, wherein the method further includes determining a/the UV dose experienced by a/the manufactured component within the environment based, at least in part, on the UV light intensity map.

A36. The method of paragraph A35, wherein the method further includes maintaining the UV dose experienced by the manufactured component below a/the threshold UV dose.

A37. The method of paragraph A36, wherein the maintaining includes replacing a UV filter configured to filter light that illuminates the environment to decrease an intensity of UV light within the light that illuminates the environment.

A38. The method of any of paragraphs A36-A37, wherein the maintaining includes decreasing exposure of the manufactured component to sunlight.

A39. The method of any of paragraphs A36-A38, wherein the maintaining includes placing a UV light-opaque cover over the manufactured component.

B1. A distributed ultraviolet (UV) light exposure monitoring system configured to monitor UV light intensity within an environment, the monitoring system comprising:

a plurality of UV detection nodes spaced apart at a plurality of node locations within the environment, wherein each of the plurality of UV detection nodes includes:

(i) a UV sensor configured to detect a respective UV light intensity at a respective node location; and (ii) a transmitter configured to generate a respective UV intensity signal indicative of the respective UV light intensity at the respective node location;

a receiver configured to receive the respective UV intensity signals from the plurality of UV detection nodes; and a data analysis system programmed to analyze the respective UV intensity signal from the plurality of UV detection nodes and to determine the respective UV light intensity at the respective node locations based, at least in part, on the respective UV intensity signal from the plurality of UV detection nodes.

B2. The monitoring system of paragraph B1, wherein the data analysis system is programmed to calculate a UV light intensity map of the environment based, at least in part, on the respective UV light intensity at the respective node locations.

B3. The monitoring system of paragraph B2, wherein the data analysis system is programmed to interpolate the UV light intensity between the respective node locations such that the UV light intensity map includes a UV light intensity within the environment at a location that is spaced apart from the plurality of node locations.

B4. The monitoring system of any of paragraphs B2-B3, wherein the data analysis system is programmed to calculate the UV light intensity map within the environment as a function of time.

B5. The monitoring system of any of paragraphs B2-B4, wherein the data analysis system is programmed to correlate the UV light intensity map to a location of a manufactured component within the environment to determine a UV dose experienced by the manufactured component within the environment.

B6. The monitoring system of any of paragraphs B1-B5, wherein the monitoring system and/or the data analysis system is programmed to perform the method of any of paragraphs A1-A39.

B7. The monitoring system of any of paragraphs B1-B6, wherein the plurality of UV detection nodes is configured to continuously, or substantially continuously, determine the respective UV light intensity at the respective node location.

B8. The monitoring system of any of paragraphs B1-B7, wherein the plurality of UV detection nodes is configured to determine the respective UV light intensity at the respective node location with at least a threshold detection frequency.

B9. The monitoring system of paragraph B8, wherein the threshold detection frequency is at least once per 1 second interval, at least once per 5 second interval, at least once per 10 second interval, at least once per 30 second interval, at least once per 1 minute interval, at least once per 5 minute interval, at least once per 10 minute interval, at least once per 15 minute interval, at least once per 30 minute interval, at least once per 1 hour interval, at least once per 2 hour interval, at least once per 4 hour interval, at least once per 6 hour interval, at least once per 9 hour interval, or at least once per 12 hour interval.

B10. The monitoring system of any of paragraphs B1-B9, wherein the plurality of UV detection nodes is spaced apart in a two-dimensional detection node array.

B11. The monitoring system of any of paragraphs B1-B10, wherein each of the plurality of UV detection nodes is spaced apart from a nearest other of the plurality of UV detection nodes by at least a threshold node spacing distance.

B12. The monitoring system of paragraph B11, wherein the threshold node spacing distance is at least 1 meter, at least 2.5 meters, at least 5 meters, at least 7.5 meters, or at least 10 meters.

B13. The monitoring system of any of paragraphs B11-B12, wherein the threshold node spacing distance is less than 30 meters, less than 25 meters, less than 20 meters, less than 15 meters, less than 10 meters, or less than 5 meters.

B14. The monitoring system of any of paragraphs B1-B13, wherein the plurality of node locations is fixed, or substantially fixed, within the environment.

B15. The monitoring system of any of paragraphs B1-B14, wherein the monitoring system further includes a mobile UV detection node, wherein the mobile UV detection node includes the UV sensor and the transmitter, and further wherein the mobile UV detection node is configured to translate within the environment.

B16. The monitoring system of paragraph B15, wherein the mobile UV detection node is associated with a/the manufactured component and is configured to translate with the manufactured component while the manufactured component is located within the environment to detect UV light exposure of the manufactured component.

B17. The monitoring system of any of paragraphs B1-B16, wherein the UV sensor is a first UV sensor that faces in a first direction, wherein one or more of the plurality of UV detection nodes further includes a second UV sensor that faces in a second direction, and further wherein the first direction is at least one of (i) opposed, or substantially opposed, to the second direction and (ii) perpendicular, or substantially perpendicular, to the second direction.

B18. The monitoring system of paragraph B17, wherein the plurality of UV detection nodes is located vertically above a floor of the environment, wherein the first direction faces toward, or perpendicular to, the floor, and further wherein the second direction faces parallel to the floor.

B19. The monitoring system of any of paragraphs B1-B18, wherein the transmitter includes at least one of a wireless transmitter configured to generate a wireless UV intensity signal and a wired transmitter configured to generate a wired UV intensity signal.

B20. The monitoring system of any of paragraphs B1-B19, wherein the receiver includes at least one of a wireless receiver configured to receive a/the wireless UV intensity signal and a wired receiver configured to receive a/the wired UV intensity signal.

B21. The monitoring system of any of paragraphs B1-B20, wherein the monitoring system further includes a notification system configured to notify a user when a/the manufactured component has received a UV dose that exceeds a predetermined threshold UV dose, wherein the data analysis system is configured to generate a dose indication signal responsive to the UV dose of the manufactured component being greater than the predetermined threshold UV dose, and further wherein the notification system is configured to receive the dose indication signal and to notify the user that the UV dose of the manufactured component exceeds the predetermined threshold UV dose responsive to receipt of the dose indication signal.

B22. The monitoring system of paragraph B21, wherein the predetermined threshold UV dose is less than a rework UV dose for the manufactured component.

B23. The monitoring system of any of paragraphs B21-B22, wherein the notification system includes at least one of an alert mechanism, an alarm, a buzzer, a light, a color-coded display, a graphical display, and an alphanumeric display that is indicative of the UV dose of the manufactured component being greater than the predetermined threshold UV dose.

B24. The monitoring system of any of paragraphs B1-B23, wherein the monitoring system further includes a data storage device configured to store the respective UV light intensity at the respective node locations.

B25. The monitoring system of paragraph B24, wherein the data storage device is further configured to store the respective node locations and to associate the respective node locations with the respective UV light intensity at the respective node locations.

B26. The monitoring system of any of paragraphs B24-B25, wherein the data storage device is further configured to store a respective time stamp for the respective UV light intensity at the respective node locations.

B27. An environment, comprising:
  the distributed UV light exposure monitoring system of any of paragraphs B1-B26;
  a/the manufactured component that includes a unique identifier, wherein the manufactured component is located within the environment; and
  a manufactured component tracking system configured to track a location of the manufactured component within the manufactured environment and to provide the location of the manufactured component to the data analysis system;
  wherein the data analysis system is programmed to determine a/the UV dose experienced by the manufactured component based, at least in part, on the location of the manufactured component within the environment and the respective UV light intensity at the respective node locations.

B28. The environment of paragraph B27, wherein the environment includes an at least partially enclosed space.

B29. The environment of any of paragraphs B27-B28, wherein the environment is configured to restrict entry of sunlight thereinto.

B30. The environment of any of paragraphs B27-B29, wherein the environment is a composite part manufacturing facility.

B31. The environment of any of paragraphs B27-B30, wherein the environment is a composite aircraft manufacturing facility.

B32. The environment of any of paragraphs B27-B31, wherein the manufactured component includes at least a portion of a composite aircraft.

C1. A data analysis system and/or a distributed ultraviolet light monitoring system programmed to perform the method of any of paragraphs A1-A39.

C2. The system of paragraph C1, wherein the data analysis system and/or the distributed ultraviolet light monitoring system includes at least one of:
  (i) a communications framework;
  (ii) a processor unit;
  (iii) a data storage device;
  (iv) memory;
  (v) persistent storage;
  (vi) a communications unit;
  (vii) an input/output unit;
  (viii) a display;
  (ix) a storage device;
  (x) computer readable media;
  (xi) computer readable storage media; and
  (xii) computer readable signal media.

C3. The system of any of paragraphs C1-C2, wherein the data analysis system and/or the distributed ultraviolet light monitoring system is programmed to execute program code.

C4. The system of any of paragraphs C1-C3, wherein the data analysis system and/or the distributed ultraviolet light monitoring system includes at least one of an electronic controller, a dedicated computer, a special-purpose computer, and a personal computer.

C5. Computer readable storage media including computer-executable instructions that, when executed, direct a data analysis system and/or a distributed ultraviolet light monitoring system to perform the method of any of paragraphs A1-A39.

As used herein, the terms "selective" and "selectively," when modifying an action, movement, configuration, or other activity of one or more components or characteristics of a system, mean that the specific action, movement, configuration, or other activity is a direct or indirect result of user manipulation of an aspect of, or one or more components of, the system.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

The invention claimed is:

1. A method of monitoring ultraviolet (UV) light intensity within an environment, the method comprising:
  detecting, with a plurality of UV detection nodes at spaced apart node locations, a UV light intensity within the environment;
  generating a plurality of respective UV intensity signals with the plurality of UV detection nodes, wherein each of the plurality of respective UV intensity signals is indicative of the respective UV light intensity at a respective one of the plurality of spaced apart node locations;
  transmitting, with a plurality of respective transmitters, the plurality of respective UV intensity signals from the plurality of UV detection nodes to a data analysis system;
  receiving, with a receiver, the plurality of respective UV intensity signals;
  determining, with the data analysis system, the respective UV light intensity at the plurality of spaced apart node locations based, at least in part, on the plurality of respective UV intensity signals;
  calculating, with the data analysis system, a UV light intensity map of the environment, wherein the calculating is based, at least in part, on the respective UV light intensity detected at the plurality of spaced apart node locations;
  tracking, with a manufactured component tracking system, a location of a manufactured component within the environment;

correlating, with the data analysis system, the UV light intensity map with the location of the manufactured component within the environment; and determining, with the data analysis system, a UV dose experienced by the manufactured component based, at least in part, on the tracking and the correlating.

2. The method of claim 1, further comprising displaying the UV light intensity map.

3. The method of claim 1, wherein the manufactured component is at least one of a composite structure and a component of an aircraft.

4. The method of claim 1, wherein the manufactured component includes a composite structure and further wherein the method includes comparing the UV dose experienced by the manufactured component to a predetermined threshold UV dose, wherein the predetermined threshold UV dose is less than a rework UV dose for the manufactured component.

5. The method of claim 4, wherein the method further includes notifying a user when the UV dose experienced by the manufactured component exceeds the predetermined threshold UV dose, wherein the notifying includes at least one of actuating an alarm, actuating a buzzer, powering a light, generating a color-coded display, generating a graphical display, and generating an alphanumeric display that is indicative of the UV dose being greater than the predetermined threshold UV dose.

6. The method of claim 1, wherein each of the plurality of UV detection nodes includes a UV sensor configured to detect the UV light intensity.

7. The method of claim 6, wherein the UV sensor is a first UV sensor that faces in a first direction, wherein at least one of the plurality of UV detection nodes further includes a second UV sensor that faces in a second direction, wherein the first direction is at least one of (i) substantially opposed to the second direction and (ii) substantially perpendicular to the second direction, wherein the detecting includes detecting a first UV light intensity with the first UV sensor and detecting a second UV light intensity with the second UV sensor, and further wherein the calculating includes calculating based, at least in part, on the first UV light intensity and the second UV light intensity.

8. The method of claim 1, wherein the calculating includes interpolating the UV light intensity among the plurality of spaced apart node locations such that the UV light intensity map includes a UV light intensity within the environment at a location that is spaced apart from the plurality of node locations.

9. The method of claim 1, wherein the calculating includes calculating the UV light intensity map within the environment as a function of time.

10. The method of claim 1, wherein the method further includes maintaining the UV dose experienced by the manufactured component below a threshold UV dose.

11. The method of claim 1, wherein a mobile UV detection node located at one of the plurality of spaced apart node locations is configured to translate within the environment, and further wherein the method includes translating the mobile UV detection node within the environment with the manufactured component such that the mobile UV detection node detects UV light exposure of the manufactured component.

12. Computer readable storage media including computer-executable instructions that, when executed, direct a distributed ultraviolet light monitoring system to perform the method of claim 1.

13. A distributed ultraviolet (UV) light exposure monitoring system configured to monitor UV light intensity within an environment, the monitoring system comprising:

a plurality of UV detection nodes spaced apart at a plurality of node locations within the environment, wherein each of the plurality of UV detection nodes includes:
(i) a UV sensor configured to detect a UV light intensity at a node location; and
(ii) a transmitter configured to generate a UV intensity signal indicative of the UV light intensity at the node location;

a receiver configured to receive the UV intensity signals from the plurality of UV detection nodes;

a data analysis system programmed to:
(i) analyze the UV intensity signal from the plurality of UV detection nodes;
(ii) determine the UV light intensity at the node locations based, at least in part, on the UV intensity signal from the plurality of UV detection nodes; and
(iii) calculate a UV light intensity map of the environment based, at least in part, on the determined UV light intensity at the node locations; and a manufactured component tracking system configured to track a location of a manufactured component within the environment and to provide the location of the manufactured component to the data analysis system.

14. The monitoring system of claim 13, wherein the data analysis system is programmed to:
(i) interpolate the UV light intensity between the node locations such that the UV light intensity map includes a UV light intensity within the environment at a location that is spaced apart from the plurality of node locations;
(ii) calculate the UV light intensity map within the environment as a function of time; and
(iii) correlate the UV light intensity map to the location of the manufactured component within the environment to determine a UV dose experienced by the manufactured component within the environment.

15. The monitoring system of claim 13, wherein the plurality of UV detection nodes is spaced apart in a two-dimensional detection node array, and further wherein each of the plurality of UV detection nodes is spaced apart from a nearest other of the plurality of UV detection nodes by at least a threshold node spacing distance of at least 1 meter and less than 30 meters.

16. The monitoring system of claim 13, wherein the plurality of node locations is substantially fixed within the environment.

17. The monitoring system of claim 13, wherein the monitoring system further includes a mobile UV detection node, wherein the mobile UV detection node includes the UV sensor and the transmitter, and further wherein the mobile UV detection node is configured to translate within the environment with the manufactured component while the manufactured component is located within the environment to detect UV light exposure of the manufactured component.

18. The monitoring system of claim 13, wherein the monitoring system further includes a notification system configured to notify a user when the UV dose received by the manufactured component exceeds a predetermined threshold UV dose, wherein the data analysis system is configured to generate a dose indication signal responsive to the UV dose of the manufactured component being greater than the predetermined threshold UV dose, and further wherein the notification system is configured to receive the dose indication signal and to notify the user that the UV dose of the manufactured component exceeds the predetermined threshold UV dose responsive to receipt of the dose indication signal.

19. A method of monitoring ultraviolet (UV) light intensity within an environment, the method comprising:
- detecting, with a plurality of UV detection nodes at spaced apart node locations, a UV light intensity within the environment;
- generating a plurality of respective UV intensity signals with the plurality of UV detection nodes, wherein each of the plurality of respective UV intensity signals is indicative of the respective UV light intensity at a respective one of the plurality of spaced apart node locations;
- transmitting, with a plurality of respective transmitters, the plurality of respective UV intensity signals from the plurality of UV detection nodes to a data analysis system;
- receiving, with a receiver, the plurality of respective UV intensity signals;
- determining, with the data analysis system, the respective UV light intensity at the plurality of spaced apart node locations based, at least in part, on the plurality of respective UV intensity signals;
- calculating, with the data analysis system, a UV light intensity map of the environment, wherein the calculating is based, at least in part, on the respective UV light intensity detected at the plurality of spaced apart node locations;
- determining a UV dose experienced by a manufactured component within the environment base, at least in part, on the UV light intensity map; and
- maintaining the UV dose experienced by the manufactured component below a threshold UV dose.

20. The method of claim 19, wherein the method further includes tracking, with a manufactured component tracking system, a location of the manufactured component within the environment; and
- correlating, with the data analysis system, the UV light intensity map with the location of the manufactured component within the environment.

* * * * *